(12) United States Patent
Wei (10) Patent No.: US 11,393,302 B2
(45) Date of Patent: Jul. 19, 2022

(54) ELECTRONIC SYSTEM SHARING POWER WITH DOORBELL AND POWER-SUPPLY METHOD THEREOF

(71) Applicant: Chicony Electronics Co., Ltd., New Taipei (TW)

(72) Inventor: Chia-Liang Wei, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 66 days.

(21) Appl. No.: 17/034,771

(22) Filed: Sep. 28, 2020

(65) Prior Publication Data

US 2021/0335106 A1    Oct. 28, 2021

(30) Foreign Application Priority Data

Apr. 27, 2020  (TW) .................................. 109114082

(51) Int. Cl.
| | |
|---|---|
| *G08B 3/10* | (2006.01) |
| *H02M 5/257* | (2006.01) |
| *G08B 5/36* | (2006.01) |
| *H02M 1/12* | (2006.01) |
| *H02M 5/06* | (2006.01) |

(52) U.S. Cl.
CPC ................ *G08B 3/10* (2013.01); *G08B 5/36* (2013.01); *H02M 1/12* (2013.01); *H02M 5/06* (2013.01); *H02M 5/2573* (2013.01)

(58) Field of Classification Search
CPC .. G08B 3/10; G08B 5/36; H02M 1/12; H02M 5/06; H02M 5/2573
See application file for complete search history.

(56) References Cited

U.S. PATENT DOCUMENTS

| | | | | |
|---|---|---|---|---|
| 5,428,388 A | * | 6/1995 | von Bauer | H04N 7/186 455/67.11 |
| 6,380,852 B1 | * | 4/2002 | Hartman | H04B 15/02 340/539.22 |
| 7,429,924 B2 | * | 9/2008 | Langer | G08B 3/10 340/392.1 |
| 9,799,174 B2 | * | 10/2017 | Wei | H02M 5/257 |
| 9,859,741 B1 | * | 1/2018 | Beagley | G08B 3/10 |
| 10,559,171 B2 | * | 2/2020 | Wu | G08B 3/10 |

* cited by examiner

*Primary Examiner* — John A Tweel, Jr.
(74) *Attorney, Agent, or Firm* — Muncy, Geissler, Olds & Lowe, P.C.

(57) ABSTRACT

An electronic system sharing power of a doorbell includes a switch circuit and an electronic device. The first and second connection terminals of the switch circuit are respectively coupled to two doorbell contacts. The second and third connection terminals of the switch circuit are respectively coupled to two ends of a doorbell. Two power terminals of the electronic device are respectively coupled to two switch contacts. A function circuit of the electronic device is coupled between the two power terminals. In a normal mode, the first connection terminal is conducted to the second connection terminal inside the switch circuit, and the two power terminals are disconnected from each other by a doorbell actuating unit of the electronic device. In a ringing mode, the doorbell actuating unit short-circuits the two power terminals, and the first connection terminal is conducted to the third connection terminal inside the switch circuit.

16 Claims, 4 Drawing Sheets

ELECTRONIC SYSTEM SHARING POWER WITH DOORBELL AND POWER-SUPPLY METHOD THEREOF

CROSS-REFERENCE TO RELATED APPLICATION

This non-provisional application claims priority under 35 U.S.C. § 119(a) to Patent Application No. 109114082 in Taiwan, R.O.C. on Apr. 27, 2020, the entire contents of which are hereby incorporated by reference.

BACKGROUND

Technical Field

The instant disclosure relates to a design regarding a circuit for sharing power with a doorbell, in particular, to an electronic system sharing power with doorbell and a power-supply method thereof.

Related Art

Commonly, buildings have the doorbell devices for visitors to notify the people in the buildings to open the doors in a simple manner. The doorbell device includes a doorbell for making sounds and a switch for driving the doorbell to make sounds. The doorbell is installed inside the residence, and the switch of the doorbell is installed on the door of the building. Therefore, visitors can press the switch to drive the doorbell inside the residence to make sounds. Accordingly, because the doorbell device is an essential element in the building, electric wires for the doorbell device are preserved in the building, so that the doorbell and the switch can be installed conveniently.

Besides installed with the doorbells, for protecting the security and safety, buildings of general residences, office buildings, or departments are installed with security devices, such as interphones, callers, fire equipment, door lock sensors, monitors, broadcasts, or other electronic devices. As a result, the buildings must be provided with additional wires for supplying power to these added security devices. Consequently, the assembling of the security devices is inconvenient.

In order to prevent from the installation of additional power wires, the electronic device is serially connected to the circuit loop of the doorbell so as to share power with the doorbell. Then, when the doorbell does not need to be operated, the doorbell can be short-circuited by the bypass circuit so as to be malfunctioned, and the circuit loop is in a connection state by serially connecting to the switch so as to supply electricity to the surveillance devices or security devices.

SUMMARY

However, it is observed that owing to impedance of the doorbell, compatible problems occur in designing bypass circuits in some cases. For example, since different doorbells have different impedances, the impedance of the bypass circuit may be incompatible with the impedance of the doorbell, such that the doorbell cannot be turned on and off properly. Furthermore, it is observed that when the doorbell is short-circuited, owing to the impedance of the doorbell, a few current still flows to the doorbell. As a result, when the current flowing to the doorbell is enough, it could cause the doorbell to incorrectly ring.

In one embodiment, an electronic system sharing power with a doorbell includes a switch circuit and an electronic device. The switch circuit includes a first connection terminal, a second connection terminal, and a third connection terminal. The first connection terminal is configured to be coupled to a first doorbell contact. The second connection terminal is configured to be coupled to a second doorbell contact and a first end of a doorbell. The third connection terminal is configured to be coupled to a second end of the doorbell. The electronic device includes a first power terminal, a second power terminal, a doorbell actuating unit, and a function circuit. The first power terminal is configured to be coupled to the first switch contact. The second power terminal is configured to be coupled to the second switch contact. The doorbell actuating unit is coupled between the first power terminal and the second power terminal. The function circuit is coupled between the first power terminal and the second power terminal, and the function circuit is configured to provide a functional operation. In a normal mode, the first connection terminal is conducted to the second connection terminal inside the switch circuit, and the first power terminal is disconnected from the second power terminal by the doorbell actuating unit. In a ringing mode, the doorbell actuating unit forms a short circuit between the first power terminal and the second power terminal, and the first connection terminal is conducted to the third connection terminal inside the switch circuit.

In one embodiment, a power-supply method for sharing power with a doorbell includes: normally conducting a first power supply loop by a switch circuit and breaking a second power supply loop by the switch circuit, so that a power supply is supplied to an electronic device through the first power supply loop and a doorbell is kept in an open-circuited state through the second power supply loop; forming a short circuit between two power terminals of the electronic device; and switching the switch circuit to break the first power supply loop and conduct the second power supply loop when the short circuit is formed, so that the power supply is supplied to the doorbell through the second power supply loop.

Based on the above, the electronic system sharing power with a doorbell and the power-supply method thereof in accordance with one or some embodiments can provide the power supply used to drive the doorbell to various electronic devices as operating power without influencing the normal use of the doorbell. Moreover, the electronic system sharing power with the doorbell and power-supply method thereof in accordance with some embodiments can be implemented by a simple circuit design without additional control circuit for controlling the switch circuit. Furthermore, in the normal mode (namely, in the case that the doorbell does not ring), the switch circuit is not directly in parallel connected to the doorbell, that is, one end of the doorbell is open circuited. Therefore, the issue of the compatibility between the doorbell and the switch circuit and the issue of the false action of the doorbell can be effectively solved.

BRIEF DESCRIPTION OF THE DRAWINGS

The disclosure will become more fully understood from the detailed description given herein below for illustration only, and thus not limitative of the disclosure, wherein.

DETAILED DESCRIPTION

In the instant disclosure, terms "coupled" or "connected" may be used to indicate that two or more elements physically or electrically contact each other directly, or may be used to indicate that two or more elements physically or electrically contact each other indirectly. Furthermore, the terms "coupled" and "connected" may also be used to indicate that two or more elements cooperate or interact with each other. It will be understood that although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Embodiments of the instant disclosure are illustrated by figures. For sake of clarity, details are provided in the descriptions for the embodiments. However, it is understood that the details are not provided for limiting the scope of the instant disclosure. In other words, in some embodiments, these details may be unnecessary. Furthermore, for the simplicity in the drawings, some common structures and elements are illustrated in the drawings in a simple manner. In all of the drawings, the same numbers are used to indicate the same or similar elements.

Figure 1:
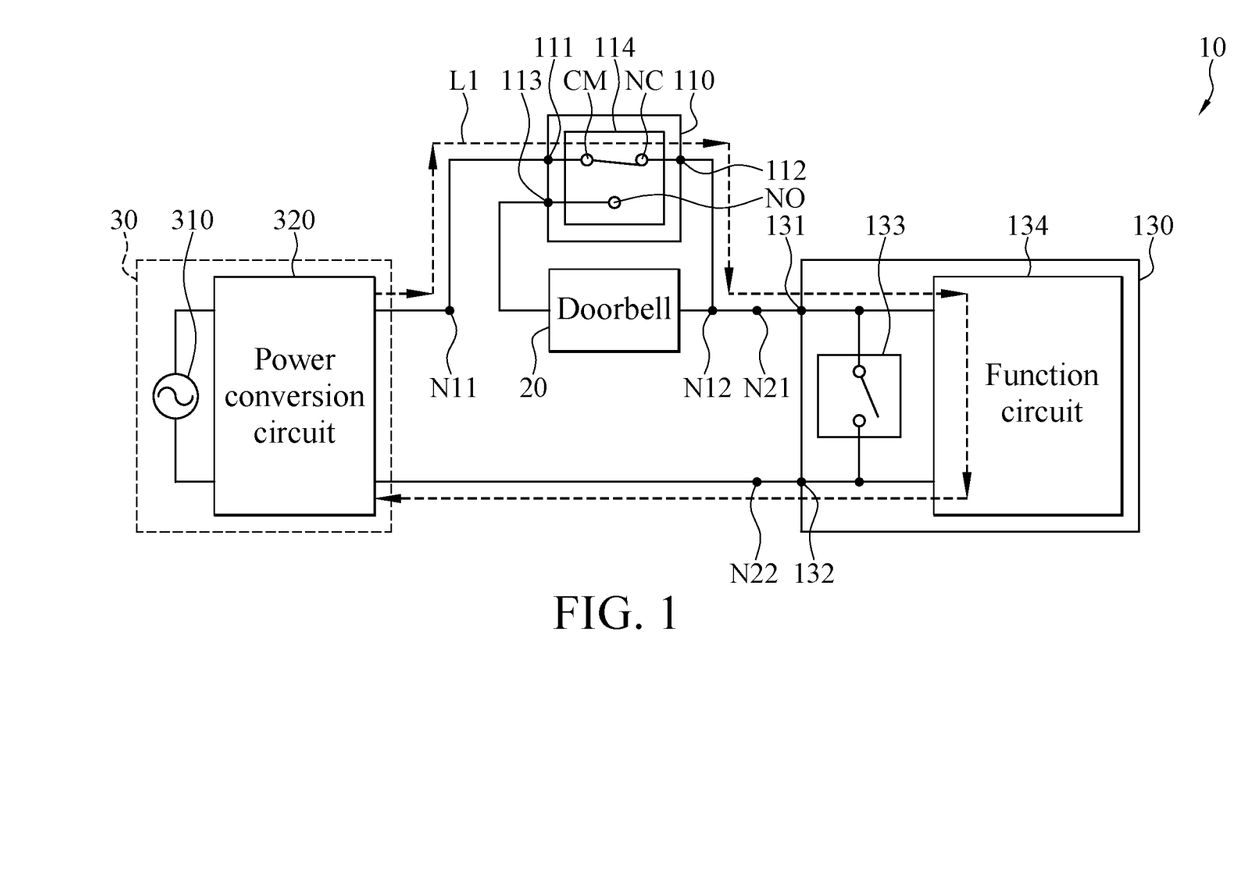
FIG. 1 illustrates a schematic view of an electronic system sharing power with a doorbell in a normal mode of an embodiment of the instant disclosure.
Figure 2:
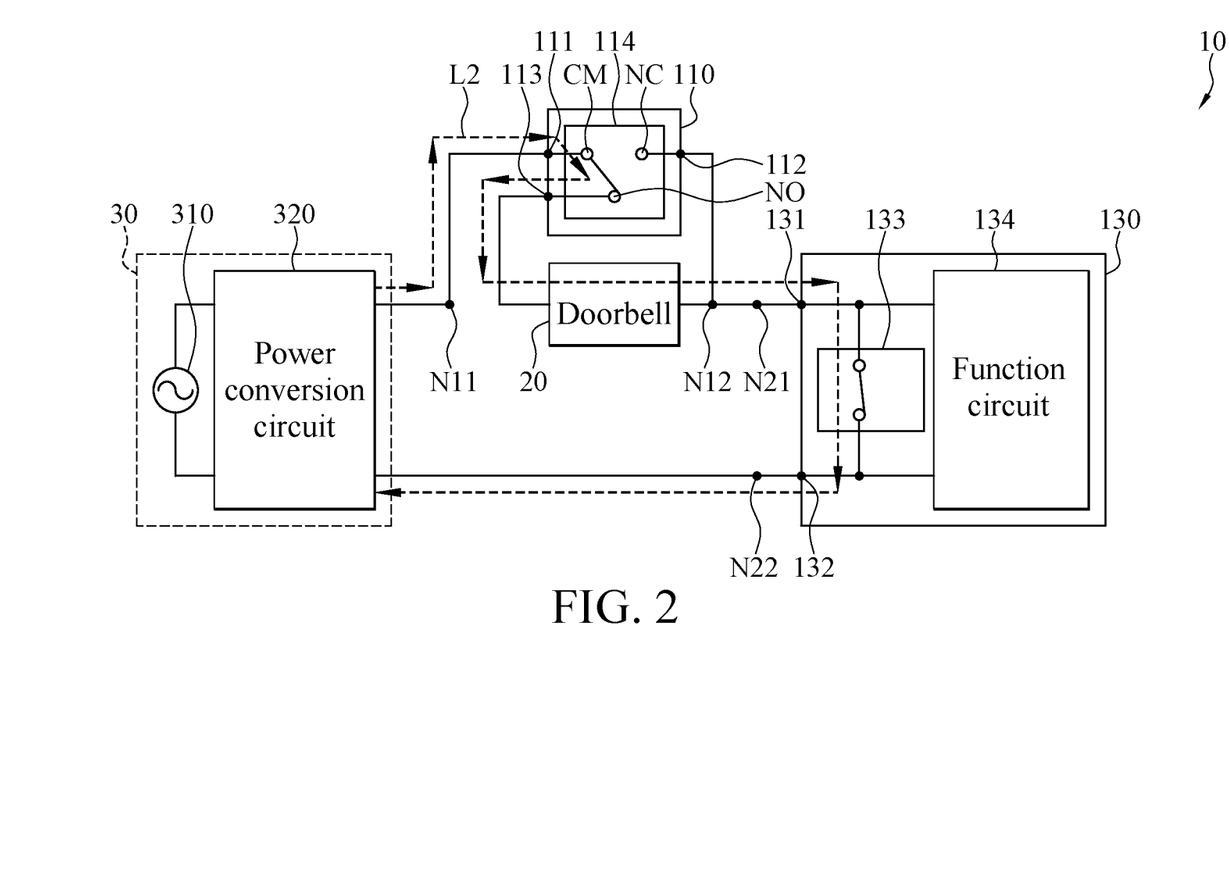
FIG. 2 illustrates a schematic view of an electronic system sharing power with a doorbell in a ringing mode of an embodiment of the instant disclosure.

FIG. 1 illustrates a schematic view of an electronic system sharing power with a doorbell in a normal mode of an embodiment of the instant disclosure. FIG. 2 illustrates a schematic view of an electronic system sharing power with a doorbell in a ringing mode of an embodiment of the instant disclosure. Referring to FIG. 1 and FIG. 2, the electronic system sharing power with the doorbell (for sake of convenience, abbreviated as electronic system 10) includes a switch circuit 110 and an electronic device 130.

The electronic device 130 includes two power terminals (hereinafter, a first power terminal 131 and a second power terminal 132), a doorbell actuating unit 133, and a function circuit 134. Specifically, in this embodiment, the function circuit 134 includes an execution circuit for providing the electronic device 130 with performing the major functions of the electronic device 130. For example, in the case that the electronic device 130 is a monitor, the function circuit 134 may comprise a monitoring circuit for providing a monitoring function. In another exemplary embodiment, in the case that the electronic device 130 is a door lock sensor, the function circuit 134 may comprise a door lock sensing circuit for providing a door lock sensing function. In the embodiments, the monitor or the door lock sensor is taken as examples for the electronic device 130, but embodiments are not limited thereto. For meeting the needs from users, the electronic device 130 may be an interphone, a caller, fire equipment, a door lock sensor, a monitor device, a broadcast, or the like. Specifically, the doorbell actuating unit 133 may be a physical switch button, a virtual switch button, or the like.

The function circuit 134 is coupled between the first power terminal 131 and the second power terminal 132, so that the function circuit 134 can receive the power supply out of the electronic device 130, through the first power terminal 131 and the second power terminal 132, for providing the power for operating the function circuit 134. Specifically, in this embodiment, the electronic device 130 may comprise a rectifying circuit. In an exemplary embodiment, the function circuit 134 not only includes the execution circuit for providing the electronic device 130 with performing the major functions of the electronic device 130, but also includes a rectifying circuit. The rectifying circuit is suitable for converting the power supply out of the electronic device into the power for the execution circuit for performing the major functions of the electronic device 130.

The doorbell actuating unit 133 is coupled between the first power terminal 131 and the second power terminal 132. In other words, a first end of the doorbell actuating unit 133 is coupled to the first power terminal 131, and the second end of the doorbell actuating unit 133 is coupled to the second power terminal 132. For example, the positive contact of the function circuit 134 and the first end of the doorbell actuating unit 133 are together coupled to the first power terminal 131, and the negative contact of the function circuit 134 and the second end of the doorbell actuating unit 133 are together coupled to the second power terminal 132.

The switch circuit 110 includes three connection terminals (hereinafter, a first connection terminal 111, a second connection terminal 112, and a third connection terminal 113).

Upon the installation of the electronic system 10, the first connection terminal 111 and the second connection terminal 112 are respectively coupled to two doorbell contacts (hereinafter, a first doorbell contact N11 and a second doorbell contact N12), and the second connection terminal 112 and the third connection terminal 113 are respectively coupled to two ends (hereinafter, a first end and a second end) of a doorbell 20. The first power terminal 131 and the second power terminal 132 are respectively coupled to two switch contacts (hereinafter, a first switch contact N21 and a second switch contact N22). In other words, the first connection terminal 111 is coupled to the first doorbell contact N11, the second connection terminal 112 is coupled to the second doorbell contact N12 and the first end of the doorbell 20, and the third connection terminal 113 is coupled to the second end of the doorbell 20. The first power terminal 131 is coupled to the first switch contact N21, and the second power terminal 132 is coupled to the second switch contact N22. In some embodiments, the doorbell 20 may be a typical doorbell, a musical doorbell, an electronic doorbell, or the like.

In some embodiments, the first doorbell contact N11 and the second doorbell contact N12 may be two contacts in the installation box hole which are reserved on the indoor wall of a building in advance for installing the doorbell 20, and the first switch contact N21 and the second switch contact N22 may be two contacts which are reserved on the outdoor wall of the building in advance for installing the doorbell button. Herein, the second doorbell contact N12 is coupled to the first switch contact N21 through the traces inside the building, and the first doorbell contact N11 and the second doorbell contact N22 are respectively coupled to the power source circuit 30 of the building through the traces inside the building. In this embodiment, the power source circuit 30 is suitable for outputting the power supply (e.g., an AC voltage). In an exemplary embodiment, the power source circuit 30 may comprise an AC power supply source 310 (e.g., the power grid), and the AC power supply source 310 may provide an AC voltage of 110V to 220V for example. In another exemplary embodiment, the power source circuit 30 may comprise an AC power supply source 310 (e.g., the power grid) and a power conversion circuit 320 (e.g., a transformer). The input end of the power conversion circuit 320 is coupled to the AC power supply source 310, and the output end of the power conversion circuit 320 is coupled to the first doorbell contact N11 and the second switch contact N22 through the traces inside the building. In this embodiment, the AC power supply source 310 may provide an AC voltage of 110V to 220V, and the AC voltage is converted into the power supply suitable for the doorbell 20, for example, the AC voltage of 110V to 220V may be converted into an AC voltage of 8V to 24V.

In this embodiment, the operation mode of the electronic system 10 includes a normal mode which occurs normally and in which the doorbell does not ring and a ringing mode in which the doorbell rings.

Refer to FIG. 1. In the normal mode, the first connection terminal 111 is conducted to the second connection terminal 112 inside the switch circuit 110, and the first power terminal 131 is disconnected from the second power terminal 132 by the doorbell actuating unit 133. In this case, the first connection terminal 111 is not conducted to the third connection terminal 113 inside the switch circuit 110, and the function circuit 134 can receive the power supply through the first power terminal 131 and the second power terminal 132. In other words, referring to FIG. 1, the power source circuit 30, the first doorbell contact N11, the first connection terminal 111, the second connection terminal 112, the second doorbell contact N12, the first switch contact N21, the first power terminal 131, the function circuit 134, the second power terminal 132, and the second switch contact N22 are sequentially conducted to each other to form a first power supply loop L1, as indicated by the circuit loop illustrated in the dashed-line arrow shown in FIG. 1, hence the power supply outputted by the power source circuit 30 is provided, through the first power supply loop L1, to the function circuit 134 as operating power and/or for charging an energy-storing element in the function circuit 134. In other words, the switch circuit 110 normally connects the first doorbell contact N11 to the second doorbell contact N12, and the doorbell actuating unit 133 normally disconnects the first power terminal 131 from the second power terminal 132, so that the power source circuit 30 is serially connected to the function circuit 134 to form a series-connection circuit loop. In this case, the first power supply loop L1 is disconnected from the second end of the doorbell 20, so that the power supply flowing in the first power supply loop L1 is not provided to the doorbell 20 (namely, the doorbell 20 does not make sounds). Namely, in the normal mode (i.e., the doorbell 20 does not make sounds), the switch circuit 110 is not directly in parallel connected to the doorbell 20, and one end of the doorbell 20 is kept open circuited. Therefore, the power supply outputted by the power source circuit 30 is not provided to the doorbell 20 due to flowing in the first power supply loop L1, hence the false action of the doorbell 20 can be prevented (e.g., the ringing of the doorbell 20 at incorrect time can be prevented). Specifically, in some embodiments, the energy-storing element in the function circuit 134 may be a battery, at least one capacitor, or the like.

Refer to FIG. 2. In the ringing mode, the doorbell actuating unit 133 is triggered to form a short circuit between the first power terminal 131 and the second power terminal 132 (namely, the first power terminal 131 is conducted to the second power terminal 132), and the first connection terminal 111 is conducted to the third connection terminal 113 inside the switch circuit 110. In this case, the first connection terminal 111 is disconnected from the second connection terminal 112 inside the switch circuit 110, and the doorbell 20 can receive the power supply through the third connection terminal 113 (i.e., through the connection between the first connection terminal 111 and the third connection terminal 113 inside the switch circuit 110, the doorbell 20 is conducted to the first doorbell contact N11) and the second doorbell contact N12. In other words, referring to FIG. 2, the power source circuit 30, the first doorbell contact N11, the first connection terminal 111, the third connection terminal 113, the doorbell 20, the second doorbell contact N12, the first switch contact N21, the first power terminal 131, the doorbell actuating unit 133, the second power terminal 132, and the second switch contact N22 are sequentially conducted to each other to form a second power supply loop L2, as indicated by the circuit loop illustrated in the dashed-line arrow shown in FIG. 2, hence the power supply outputted by the power source circuit 30 is provided to the doorbell 20 as operating power (namely, the doorbell 20 makes sounds) due to flowing in the second power supply loop L2. In this case, the second power supply loop L2 bypasses the function circuit 134. In other words, the switch circuit 110 conducts the first doorbell contact N11 to the second end of the doorbell 20, and the doorbell actuating unit 133 conducts the first power terminal 131 to the second power terminal 132, so that the power source circuit 30, the doorbell 20, and the doorbell actuating unit 133 form a series-connection circuit loop. In some embodiments, when the second power supply loop L2 bypasses the function circuit 134, the operating power for the function circuit 134 may be provided by the energy-storing element built in the function circuit 134.

In other words, the switch circuit 110 normally conducts the first power supply loop L1 and breaks the second power supply loop L2, so that the power supply is provided for the function circuit 134 of the electronic device 130 through the first power supply loop L1, and the doorbell 20 is open circuited (i.e. not conducted) to the power supply due to breaking the second power supply loop L2. In this case, the doorbell 20 does not make sounds.

When the doorbell actuating unit 133 is triggered, the doorbell actuating unit 133 forms the short circuit between the two power terminals of the electronic device 130 (namely, the doorbell actuating unit 133 short-circuits the first power terminal 131 and the second power terminal 132). When the short circuit is formed, the switch circuit 110 is switched to break the first power supply loop L1 and to conduct the second power supply loop L2, so that the power supply is provided for the doorbell 20 due to conducting the second power supply loop L2. In this case, the second power supply loop L2 bypasses the function circuit 134 of the electronic device 130, and the doorbell 20 is driven by the power supply source to make sounds.

In one embodiment, after the doorbell actuating unit 133 is triggered, the length of time for short-circuiting the first power terminal 131 and the second power terminal 132 can be determined by the function circuit 134 (e.g., by a control circuit). In other words, when the doorbell actuating unit 133 is triggered, the function circuit 134 can control the length of time of the switch-on of the doorbell actuating unit 133, i.e. duration of the short circuit. In another embodiment, after the doorbell actuating unit 133 is triggered, the length of time for short-circuiting the first power terminal 131 and the second power terminal 132 can be determined by pressing time of the user. In other words, when the user keeps pressing the doorbell actuating unit 133, the doorbell actuating unit 133 keeps short-circuiting the first power terminal 131 and the second power terminal 132 until the user releases the doorbell actuating unit 133 (namely, until the user does not press the doorbell actuating unit 133).

In some embodiments, the switch circuit 110 may further include a relay 114. The relay 114 has a common terminal CM, a normally-closed terminal NC, and a normally-open terminal NO. The common terminal CM is coupled to the first connection terminal 111. The normally-closed terminal NC is coupled to the second connection terminal 112. The normally-open terminal NO is coupled to the third connection terminal 113. The common terminal CM is normally conducted to the normally-closed terminal NC inside the relay 114. In other words, in the normal mode, the common terminal CM is conducted to the normally-closed terminal NC inside the relay 114. Conversely, in the ringing mode, the common terminal CM is conducted to the normally-open terminal NO inside the relay 114. In this embodiment, the switch circuit 110 includes one relay 114 is taken as an example, but it is understood that the number of relays 114 is not limited. In some embodiments, under the same operation principle, the switch circuit 110 may include several relays 114 to implement the operation of the switch circuit 110.

In some embodiments, the relay 114 may be an electrical relay, such as an optical coupling relay. In this embodiment, the control terminal of the relay 114 is also coupled to the first connection terminal 111. In other words, the relay 114 is controlled by the voltage of the first doorbell contact N11.

Figure 3:
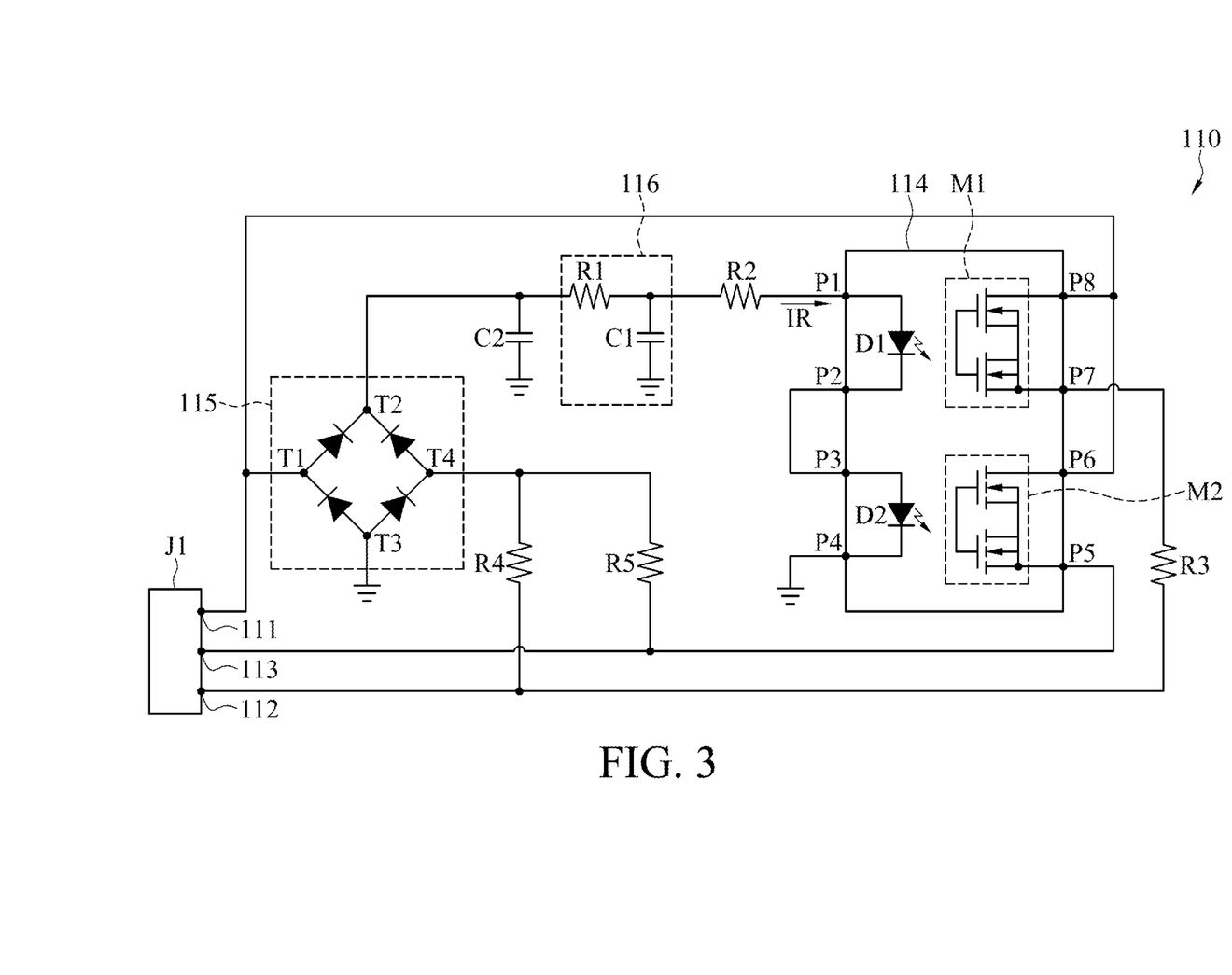
FIG. 3 illustrates a schematic circuit diagram of the switch circuit shown in FIG. 1 of an exemplary embodiment.
Figure 4:
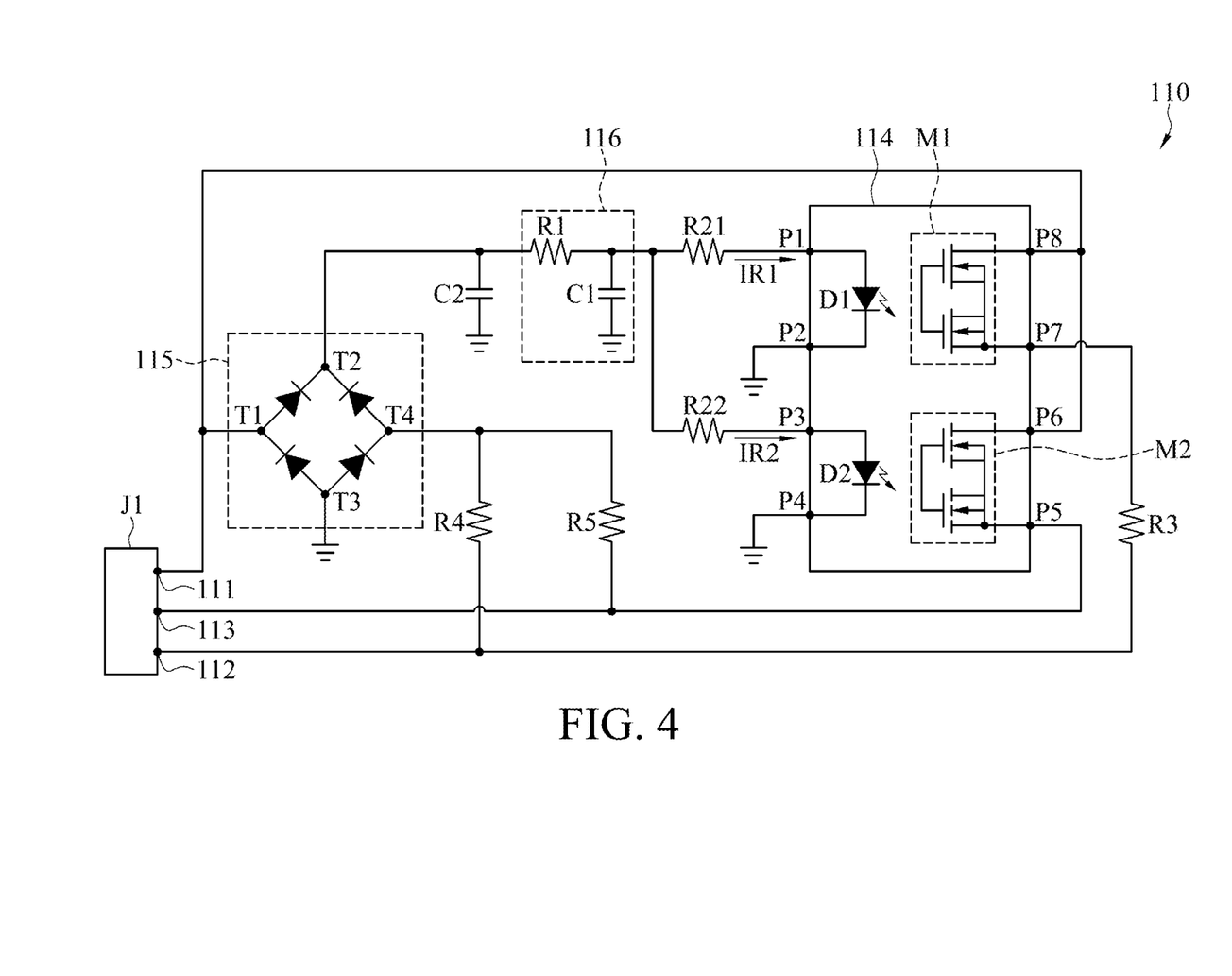
FIG. 4 illustrates a schematic circuit diagram of the switch circuit shown in FIG. 1 of another exemplary embodiment.

In some embodiments, as shown in FIG. 3 or FIG. 4, FIG. 3 illustrates a schematic circuit diagram of the switch circuit 110 shown in FIG. 1 of an exemplary embodiment, and FIG. 4 illustrates a schematic circuit diagram of the switch circuit 110 shown in FIG. 1 of another exemplary embodiment. The switch circuit 110 may further include a rectifying circuit 115 and a relay 114. The rectifying circuit 115 has a first end T1 and a second end T2. The first end T1 of the rectifying circuit 115 is coupled to the first connection terminal 111. In this exemplary embodiment, the relay 114 is an optical coupling relay. The relay 114 has two light emitting elements (hereinafter, a first light emitting element D1 and a second light emitting element D2) and two light receiving elements (hereinafter, a first light receiving element M1 and a second light receiving element M2). The first light emitting element D1 and the second light emitting element D2 are coupled between the second end T2 of the rectifying circuit 115 and the ground. The first light receiving element M1 is coupled between the first connection terminal 111 and the second connection terminal 112, and the first light receiving element M1 is controlled by the first light emitting element D1. The second light receiving element M2 is coupled between the first connection terminal 111 and the third connection terminal 113, and the second light receiving element M2 is controlled by the second light emitting element D2. In this embodiment, the first light receiving element M1 is normally in a connection state, and the second light receiving element M2 is normally in a disconnection state. In other words, in the normal mode, the first light receiving element M1 conducts the first connection terminal 111 to the second connection terminal 112, and the second light receiving element M2 does not conduct the first connection terminal 111 to the third connection terminal 113. In the ringing mode, the first light receiving element M1 does not conduct the first connection terminal 111 to the second connection terminal 112, and the second light receiving element M2 conducts the first connection terminal 111 to the third connection terminal 113.

In some embodiments, the first light emitting element D1 and the second light emitting element D2 may be connected to an impedance element R2 or impedance elements R21, R22 outside the relay 114, as shown in FIG. 3 and FIG. 4. Accordingly, the switching sensitivity of the relay 114 can be determined by choosing the proper impedance value of the impedance element(s) R2 (or R21, R22). Moreover, the impedance element R2 or the impedance elements R21, R22 may be implemented by one or more resistors.

In an exemplary embodiment, as shown in FIG. 3, the first end of the impedance element R2 is coupled to the second end T2 of the rectifying circuit 115. The first light emitting element D1 and the second light emitting element D2 are forward connected between the second end of the impedance element R2 and the ground in the same voltage direction. For example, the relay 114 has eight pins P1-P8. Regarding the internal circuit of the relay 114, the positive electrode of the first light emitting element D1 is coupled to the pin P1, and the negative electrode of the first light emitting element D1 is coupled to the pin P2. The positive electrode of the second light emitting element D2 is coupled to the pin P3, and the negative electrode of the second light emitting element D2 is coupled to the pin P4. The first end of the first light receiving element M1 is coupled to the pin P8, and the second end of the first light receiving element M1 is coupled to the pin P7. The first end of the second light receiving element M2 is coupled to the pin P6, and the second end of the second light receiving element M2 is coupled to the pin P5. Regarding the external circuit of the relay 114, the pin P1 is coupled to the second end of the impedance element R2, the pin P2 is coupled to the pin P3, the pin P4 is coupled to the ground, the pin P5 is coupled to the third connection terminal 113, the pin P6 and the pin P8 are coupled to the first connection terminal 111, and the pin P7 is coupled to the second connection terminal 112 via a current-limiting impedance R3. In this embodiment, the pin P1 is the control terminal of the relay 114, the pin P6 and the pin P8 are the common terminal CM of the relay 114, the pin P5 is the normally-open terminal NO of the relay 114, and the pin P7 is the normally-closed terminal NC of the relay 114. Moreover, the current-limiting impedance R3 may be implemented by a resistor.

In another exemplary embodiment, as shown in FIG. 4, the first light emitting element D1 and the second light emitting element D2 are respectively connected to two impedance elements R21, R22 (hereinafter, a first impedance element R21 and a second impedance element R22). The first end of the first impedance element R21 and the first end of the second impedance element R22 are coupled to the second end T2 of the rectifying circuit 115. The second end of the first impedance element R21 is coupled to the first end of the first light emitting element D1. The second end of the second impedance element R22 is coupled to the first end of the second light emitting element D2. The second end of the first light emitting element D1 and the second end of the second light emitting element D2 are coupled to the ground. For example, the relay 114 may have eight pins P1-P8, and the description about the internal circuit of the relay 114 is already provided in foregoing paragraphs and is omitted here. Regarding the external circuit of the relay 114, the pin P1 is coupled to the second end of the first impedance element R21, the pin P2 is coupled to the ground, the pin P3 is coupled to the second end of the second impedance element R22, the pin P4 is coupled to the ground, the pin P5 is coupled to the third connection terminal 113, the pin P6 and the pin P8 are coupled to the first connection terminal 111, and the pin P7 is coupled to the second connection terminal 112 via the current-limiting impedance R3. In this embodiment, the pin P1 and the pin P3 are the control terminal of the relay 114, the pin P6 and the pin P8 are the common terminal CM of the relay 114, the pin P5 is the normally-open terminal NO of the relay 114, and the pin P7 is the normally-closed terminal NC of the relay 114. Moreover, the current-limiting impedance R3 may be implemented by a resistor.

Referring to FIG. 1 and FIG. 3 (or FIG. 1 and FIG. 4), in the normal mode, the doorbell actuating unit 133 is in a disconnection state (namely, open-circuited), and the current-limiting impedance R3 and the function circuit 134 form a series-connection circuit loop. In this embodiment, since the resistance of the current-limiting impedance R3 is less than the resistance of the function circuit 134, most of the output voltage (namely, the power supply) supplied by the power source circuit 30 may be provided for the function circuit 134. Moreover, the terminal voltage of the first end of the impedance element R2 (or the impedance elements R21, R22) may be lesser, so that the driving current IR (or the driving currents IR1, IR2) which can be provided for the control terminal of the relay 114 through the impedance element R2 (or the impedance elements R21, R22) may be lesser. In other words, in this case, the driving current IR (or the driving currents IR1, IR2) is less than the conduction threshold value of the relay 114. Therefore, in responsive to the driving current IR (or the driving current IR1), the first light emitting element D1 controls the corresponding first light receiving element D1 to be in the connection state, and in responsive to the driving current IR (or the driving current IR2), the second light emitting element D2 controls the corresponding second light receiving element M2 to be in the open-circuited state. In this case, the second end of the doorbell 20 is open-circuited.

Referring to FIG. 2 and FIG. 3 (or FIG. 2 and FIG. 4), when the user triggers the doorbell actuating unit 133 (e.g., the user presses the switch button), the electronic system 10 now enters into the ringing mode. In the ringing mode, the doorbell actuating unit 133 is in a connection state, so that the first power terminal 131 and the second power terminal 132 are short-circuited. In this case, all the output voltage (namely, the power supply source) of the power circuit 30 are applied to the current-limiting impedance R3. Hence, the terminal voltage of the first end of the impedance element R2 (or the impedance elements R21, R22) may be increased, so the driving current IR (or the driving currents IR1, IR2) provided for the control terminal of the relay 114 through the impedance element R2 (or the impedance elements R21, R22) may be increased. When the driving current IR (or the driving currents IR1, IR2) is large enough (namely, when the driving current IR (or the driving currents IR1, IR2) is greater than the conduction threshold value of the relay 114), the driving current IR (or the driving currents IR1, IR2) triggers the switch circuit 110 to be switched. In other words, the first light emitting element D1, in responsive to the driving current IR (or the driving current IR1), controls the corresponding first light receiving element M1 to be switched into the open-circuited state. In addition, the second light emitting element D2, in responsive to the driving current IR (or the driving current IR2), controls the corresponding second light receiving element M2 to be switched into the connection state. In the case, the power circuit 30 and the doorbell 20 forms a circuit loop through the switch circuit 110, so that the doorbell 20 receives the power supply from the power circuit 30 to make sounds.

When the doorbell 20 ends the ringing mode (e.g., the user releases the switch button or the preset duration of the short circuit is reached), the doorbell actuating unit 133 recovers to the open-circuited state; namely, the electronic system 10 now is in the normal state.

In some embodiments, a filtering circuit 116 and/or a voltage regulating element C2 (namely, the filtering circuit 116, the voltage regulating element C2, or both the filtering circuit 116 and the voltage regulating element C2) may be coupled between the second end T2 of the rectifying circuit 115 and the relay 114, so that a relatively stable signal can be provided for the relay 114. In this embodiment, the filtering circuit 116 may be coupled between the second end T2 of the rectifying circuit 115 and the first end of the impedance element R2 (or the impedance elements R21, R22). The voltage regulating element C2 is coupled to the second end T2 of the rectifying circuit 115. In some embodiments, the filtering circuit 116 may be an RC circuit formed by a resistor R1 and a capacitor C1. The voltage regulating element C2 may be implemented by a capacitor.

In some embodiments, the rectifying circuit 115 may be a bridge rectifier. In an exemplary embodiment, as shown in FIG. 3, the rectifying circuit 115 further has a third end T3 and a fourth end T4. The third end T3 of the rectifying circuit 115 is coupled to the ground. The fourth end T4 of the rectifying circuit 115 is coupled to the second connection terminal 112 through the resistor R4, and the fourth end T4 of the rectifying circuit 115 is further coupled to the third connection terminal 113 through the resistor R5. In another exemplary embodiment, as shown in FIG. 4, the rectifying circuit 115 further has a third end T3 and a fourth end T4. The third end T3 of the rectifying circuit 115 is coupled to the ground. The fourth end T4 of the rectifying circuit 115 is coupled to the second connection terminal 112 through the resistor R4, and the fourth end T4 of the rectifying circuit 115 is further coupled to the third connection terminal 113 through the resistor R5.

Based on the above, the electronic system sharing power with a doorbell and the power-supply method thereof in accordance with one or some embodiments can provide the power supply used to drive the doorbell 20 to the electronic device 130 as operating power without influencing the normal use of the doorbell 20. Moreover, the electronic system sharing power with the doorbell and the power-supply method thereof of in accordance with some embodiments can be implemented by a simple circuit design without additional control circuit for controlling the switch circuit 110. Furthermore, in the normal mode (namely, in the case that the doorbell 20 does not ring), the switch circuit 110 is not directly in parallel connected to the doorbell 20, that is, one end of the doorbell 20 is open circuited. Therefore, the issue of the compatibility between the doorbell 20 and the switch circuit 110 and the issue of the false action of the doorbell 20 can be effectively solved.

What is claimed is:

1. An electronic system sharing power with a doorbell, comprising:
    a switch circuit, comprising:
        a first connection terminal, configured to be coupled to a first doorbell contact;
        a second connection terminal, configured to be coupled to a second doorbell contact, wherein the second doorbell contact is further coupled to a first end of a doorbell; and
        a third connection terminal, configured to be coupled to a second end of the doorbell; and
    an electronic device, comprising:
        a first power terminal, configured to be coupled to a first switch contact;

a second power terminal, configured to be coupled to a second switch contact;
a doorbell actuating unit, coupled between the first switch contact and the second switch contact; and
a function circuit, coupled between the first power terminal and the second power terminal, and configured to provide a functional operation;
wherein in a normal mode, the first connection terminal is conducted to the second connection terminal inside the switch circuit, and the first power terminal is disconnected from the second power terminal by the doorbell actuating unit; and
wherein in a ringing mode, the doorbell actuating unit forms a short circuit between the first power terminal and the second power terminal, and the first connection terminal is conducted to the third connection terminal inside the switch circuit.

2. The electronic system sharing power with the doorbell according to claim 1, wherein the switch circuit further comprises:
a relay, having a common terminal, a normally-closed terminal, and a normally-open terminal, wherein the common terminal is coupled to the first connection terminal, the normally-closed terminal is coupled to the second connection terminal, and the normally-open terminal is coupled to the third connection terminal;
wherein in the normal mode, the common terminal is conducted to the normally-closed terminal inside the relay, and wherein in the ringing mode, the common terminal is conducted to the normally-open terminal inside the relay.

3. The electronic system sharing power with the doorbell according to claim 1, wherein the switch circuit further comprises:
a rectifying circuit, wherein a first end of the rectifying circuit is coupled to the first connection terminal;
a first light emitting element, coupled between a second end of the rectifying circuit and a ground;
a second light emitting element, coupled between the second end of the rectifying circuit and the ground;
a first light receiving element, coupled between the first connection terminal and the second connection terminal, wherein the first light receiving element is controlled by the first light emitting element; and
a second light receiving element, coupled between the first connection terminal and the third connection terminal, wherein the second light receiving element is controlled by the second light emitting element.

4. The electronic system sharing power with the doorbell according to claim 3, wherein the switch circuit further comprises:
a current-limiting impedance, coupled between the first light emitting element and the second connection terminal.

5. The electronic system sharing power with the doorbell according to claim 4 wherein the switch circuit further comprises:
a voltage regulating element, coupled to the second end of the rectifying circuit.

6. The electronic system sharing power with the doorbell according to claim 3, wherein the switch circuit further comprises:
a filtering circuit, coupled to the second end of the rectifying circuit.

7. The electronic system sharing power with the doorbell according to claim 6, wherein the switch circuit further comprises:

a current-limiting impedance, coupled between the first light emitting element and the second connection terminal.

8. The electronic system sharing power with the doorbell according to claim 7, wherein the switch circuit further comprises:
a voltage regulating element, coupled to the second end of the rectifying circuit.

9. The electronic system sharing power with the doorbell according to claim 3, wherein the switch circuit further comprises:
an impedance element, coupled between the second end of the rectifying circuit and the first light emitting element, wherein the first light emitting element and the second light emitting element are forward connected between the impedance element and the ground in a same voltage direction.

10. The electronic system sharing power with the doorbell according to claim 9, wherein the switch circuit further comprises:
a current-limiting impedance, coupled between the first light emitting element and the second connection terminal.

11. The electronic system sharing power with the doorbell according to claim 10, wherein the switch circuit further comprises:
a voltage regulating element, coupled to the second end of the rectifying circuit.

12. The electronic system sharing power with the doorbell according to claim 3, wherein the switch circuit further comprises:
a first impedance element, coupled between the second end of the rectifying circuit and a first end of the first light emitting element, wherein a second end of the first light emitting element is coupled to the ground; and
a second impedance element, coupled between the second end of the rectifying circuit and a first end of the second light emitting element, wherein a second end of the second light emitting element is coupled to the ground.

13. The electronic system sharing power with the doorbell according to claim 12, wherein the switch circuit further comprises:
a current-limiting impedance, coupled between the first light emitting element and the second connection terminal.

14. The electronic system sharing power with the doorbell according to claim 13, wherein the switch circuit further comprises:
a voltage regulating element, coupled to the second end of the rectifying circuit.

15. A power-supply method for sharing power with a doorbell, comprising:
normally conducting a first power supply loop by a switch circuit and breaking a second power supply loop by the switch circuit, so that a power supply is supplied to an electronic device through the first power supply loop and a doorbell is kept in an open-circuited state through the second power supply loop;
forming a short circuit between two power terminals of the electronic device; and
when the short circuit is formed, switching the switch circuit to break the first power supply loop and conduct the second power supply loop, so that the power supply is supplied to the doorbell through the second power supply loop.

16. The power-supply method for sharing power with the doorbell according to claim 15, wherein the step of switching the switch circuit to break the first power supply loop and conduct the second power supply loop comprises:
  generating a driving current according to the power supply; and
  driving the switch circuit to be switched by the driving current.

* * * * *